(12) United States Patent
Jeong et al.

(10) Patent No.: US 11,863,095 B2
(45) Date of Patent: Jan. 2, 2024

(54) MOTOR DRIVING DEVICE AND METHOD

(71) Applicants: Hyundai Motor Company, Seoul (KR); Kia Motors Corporation, Seoul (KR); Seoul National University R&DB Foundation, Seoul (KR)

(72) Inventors: Kang Ho Jeong, Gyeonggi-do (KR); Sang Cheol Shin, Gyeonggi-do (KR); Yong Jae Lee, Gyeonggi-do (KR); Jung Ik Ha, Seoul (KR); Hyeon Gyu Choi, Gyeonggi-do (KR); Jae Hoon Shim, Gyeonggi-do (KR)

(73) Assignees: Hyundai Motor Company, Seoul (KR); Kia Corporation, Seoul (KR); Seoul National University R & DB Foundation, Seoul (KR)

( * ) Notice: Subject to any disclaimer, the term of this patent is extended or adjusted under 35 U.S.C. 154(b) by 0 days.

(21) Appl. No.: 17/096,085

(22) Filed: Nov. 12, 2020

(65) Prior Publication Data
US 2022/0077807 A1    Mar. 10, 2022

(30) Foreign Application Priority Data
Sep. 4, 2020    (KR) .................. 10-2020-0113080

(51) Int. Cl.
*H02P 27/08*    (2006.01)
*H02P 21/22*    (2016.01)

(52) U.S. Cl.
CPC ............ *H02P 27/085* (2013.01); *H02P 21/22* (2016.02)

(58) Field of Classification Search
CPC .......... Y02T 10/64; H02P 25/22; H02P 27/00; H02P 27/04; H02P 27/06; H02P 27/08;
(Continued)

(56) References Cited

U.S. PATENT DOCUMENTS 4,160,938 A    7/1979    Akamatsu
5,352,964 A *  10/1994   Nakamura .............. H02P 25/18
                                                   318/771
(Continued)

FOREIGN PATENT DOCUMENTS

CN    116587869 A    8/2023
EP    2 797 221 A1   10/2014
(Continued)

OTHER PUBLICATIONS

Office Action dated Jun. 14, 2023 in U.S. Appl. No. 17/842,939.
Office Action dated Nov. 2, 2023 in U.S. Appl. No. 17/862,753.

*Primary Examiner* — Antony M Paul
(74) *Attorney, Agent, or Firm* — Fox Rothschild LLP

(57) ABSTRACT

A motor driving device drives a motor having a plurality of windings corresponding to a plurality of phases. The motor driving device includes: a first inverter configured to include a plurality of first switching elements and connected to first stages of the plurality of windings; a second inverter configured to include a plurality of second switching elements and connected to second stages of the plurality of windings; and a controller configured to fix switching states of the second switching elements and switch the first switching elements to compose target voltage vectors if the motor is (Continued)

driven in an open end winding type by operating the first inverter and the second inverter in a space vector pulse width modulation mode.

12 Claims, 8 Drawing Sheets

(58) Field of Classification Search
CPC .......... H02P 21/02; H02P 21/20; H02P 21/22; H02P 23/00; H02P 23/14; H02P 23/07; H02P 25/00; H02P 25/062; H02P 25/064; H02P 25/107; H02P 7/29; H02P 6/08; H02P 6/04; H02P 6/28; H02P 1/00; H02P 1/16; H02P 1/24; H02P 1/26; H02P 1/42; H02P 1/46; H02P 1/465; H02P 3/14; B60L 15/007; B60Y 2200/92; H02M 7/53871; B60K 23/08; B60W 10/00; B66B 1/308; H02J 1/082; Y02E 60/10; Y10S 903/93; B60R 16/03; F02N 11/006; F03D 9/25; H01M 10/05; H02K 1/00; Y02P 70/50; Y04S 30/14; Y10T 29/49108

USPC .................... 318/811, 400.27, 139, 440, 801
See application file for complete search history.

(56) References Cited

U.S. PATENT DOCUMENTS

| 8,054,032 | B2 | 11/2011 | Chakrabarti et al. |
| 8,482,230 | B2 | 7/2013 | Bouchez et al. |
| 11,258,391 | B2* | 2/2022 | Saha ...................... H02M 7/501 |
| 2009/0033253 | A1 | 2/2009 | Nagashima et al. |
| 2011/0234139 | A1* | 9/2011 | Hsu .......................... H02P 25/18 |
| | | | 318/497 |

FOREIGN PATENT DOCUMENTS

| JP | 2019/47670 A | * | 3/2016 | ............. H02P 21/22 |
| JP | 6087666 B2 | | 3/2017 | |
| JP | 6285256 B2 | | 2/2018 | |
| JP | 2019-047670 A | | 3/2019 | |
| JP | WO 2020/255988 A1 | * | 12/2020 | ............. H02P 25/22 |
| KR | 10-2021-0008974 A | | 1/2021 | |
| WO | 2018/095868 A1 | | 5/2018 | |

* cited by examiner

MOTOR DRIVING DEVICE AND METHOD

CROSS-REFERENCE TO RELATED APPLICATION

This application claims under 35 U.S.C. § 119(a) the benefit of Korean Patent Application No. 10-2020-0113080, filed on Sep. 4, 2020 in the Korean Intellectual Property Office, the entire contents of which are incorporated by reference herein.

BACKGROUND

1. Technical Field

The present disclosure relates to a motor driving device, more particularly, to the motor driving device capable of converting a motor driving mode into a Y-connected motor driving mode and an open end winding motor driving mode according to a required output of a motor so as to improve efficiency of an inverter for driving the motor.

2. Description of the Related Art

In general, windings of phases of a motor are connected to one inverter at first ends thereof and to each other at second ends thereof, thereby forming a Y-connection.

When the motor is driven, a switching element inside the inverter applies a line voltage to the Y-connected windings of the motor to generate an alternating current (AC) while being turned on/off by pulse width modulation control, thereby generating torque.

Fuel economy (or power economy) of an eco-friendly vehicle such as an electric vehicle using the torque generated by the motor in this way is determined by inverter-motor power conversion efficiency. For this reason, to improve the fuel economy, it is important to maximize power conversion efficiency of the inverter and efficiency of the motor.

Efficiency of an inverter-motor system is mainly determined by a voltage utilization factor of the inverter. In the case where an operating point of the vehicle determined by a relationship between a motor speed and torque in a high section of the voltage utilization factor is formed, the fuel economy of the vehicle can be improved.

However, as the number of turns of the motor increases to increase maximum torque of the motor, a high section of the voltage utilization factor becomes distant from a low torque region that is a major operating point of the vehicle. As a result, a problem may occur in that the fuel economy is deteriorated. In addition, in a case where a major operating point is designed to be included in the high section of the voltage utilization factor in view of the fuel economy, there is a constraint on the maximum torque of the motor. Thus, a problem may occur in that acceleration departure performance of the vehicle is deteriorated.

Therefore, a motor driving technology capable of improving efficiency of a system while covering both low and high output sections using one motor is required in the technical field.

The information disclosed in this Background section is only for the enhancement of understanding of the background of the present disclosure, and should not be taken as an acknowledgment or as any form of suggestion that this information forms the prior art that would already be known to a person of ordinary skill in the art.

SUMMARY

Therefore, the technical problem to be solved by the present disclosure is to provide a motor driving device capable of converting a motor driving mode into a Y-connected motor driving mode and an open end winding motor driving mode according to a required output of a motor so as to improve efficiency of an inverter for driving the motor.

In order to solve the technical problem, the present disclosure provides a motor driving device that drives a motor having a plurality of windings corresponding to a plurality of phases and includes: a first inverter configured to include a plurality of first switching elements and connected to first stages of the plurality of windings; a second inverter configured to include a plurality of second switching elements and connected to second stages of the plurality of windings; and a controller configured to fix switching states of the second switching elements and switch the first switching elements to compose target voltage vectors if the motor is driven in an open end winding type by operating the first inverter and the second inverter in a space vector pulse width modulation mode.

In an embodiment of the present disclosure, the controller may compose the target voltage vectors excluding voltage vectors in which a difference between a common mode voltage of the first inverter and a common mode voltage of the second inverter is not zero among voltage vectors composed by the first inverter and the second inverter.

In an embodiment of the present disclosure, the controller may compose the target voltage vectors by fixing ON/OFF states of the second switching elements and switching the first switching elements according to each region of voltage vectors composed by the first inverter and the second inverter.

In an embodiment of the present disclosure, the controller may connect points at which switching states of the second inverter are the same in a vector diagram illustrating the voltage vectors composed by the first inverter and the second inverter, and previously set the regions.

In an embodiment of the present disclosure, the controller may compose the target voltage vectors by fixing switching states of the second switching elements corresponding to a region within which the target voltage vectors fall and switching the first switching elements to repeat switching states of the first switching elements in a given pattern.

In an embodiment of the present disclosure, a switching loss of the first switching elements may be smaller than that of the second switching elements.

In an embodiment of the present disclosure, the first switching elements may be field effect transistors (FETs) formed of SiC, and the second switching elements may be insulated-gate bipolar transistors (IGBTs) formed of Si.

To solve the technical problem, the present disclosure provides a motor driving device that drives a motor having a plurality of windings corresponding to a plurality of phases and includes: a first inverter configured to include a plurality of first switching elements and connected to first stages of the plurality of windings; a second inverter configured to include a plurality of second switching elements and connected to second stages of the plurality of windings; a plurality of third switching elements, first ends of which are connected to points dividing the number of turns of the plurality of windings at a preset ratio and second ends of which are interconnected; and a controller configured to turn off the third switching elements if a required output of the motor is more than or equal to a preset reference value, and operate the first inverter and the second inverter in a space vector pulse width modulation mode by fixing switching states of the second switching elements and switching the first switching elements to compose target voltage vectors.

According to the motor driving device, the motor driving device can determine whether to divide a turn ratio of the windings of the motor on the basis of the required output of the motor, divide the number of turns of the windings in a low output region such that the major drive points of the vehicle are included in a high efficiency region of the motor-inverter system in order to improve efficiency of the motor-inverter system, and realize high torque with a low current using the whole number of turns of the windings in a high output region.

According to the motor driving device, the motor driving device can improve efficiency in an entire torque region to contribute to improving fuel economy of the vehicle, compared to a case where a conventional Y-connected motor is driven by one inverter.

In addition, according to the motor driving device, during open end winding type driving that simultaneously operates the two inverters connected to the opposite ends of the windings of the motor and drives the motor, switching of the inverter using the switching elements having a great switching loss when voltage vectors are composed for space vector pulse width modulation is minimized, and switching of the inverter using the switching elements having a relatively small switching loss is performed. Thereby, a switching loss can be reduced, and efficiency of the entire system can be improved.

Effects obtainable from the present disclosure are not limited by the above-mentioned effects, and other unmentioned effects can be clearly understood from the following description by those having ordinary skill in the technical field to which the present disclosure pertains.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a motor driving device according to various embodiments of the present disclosure will be described in detail with reference to the attached drawings.

Figure 1:
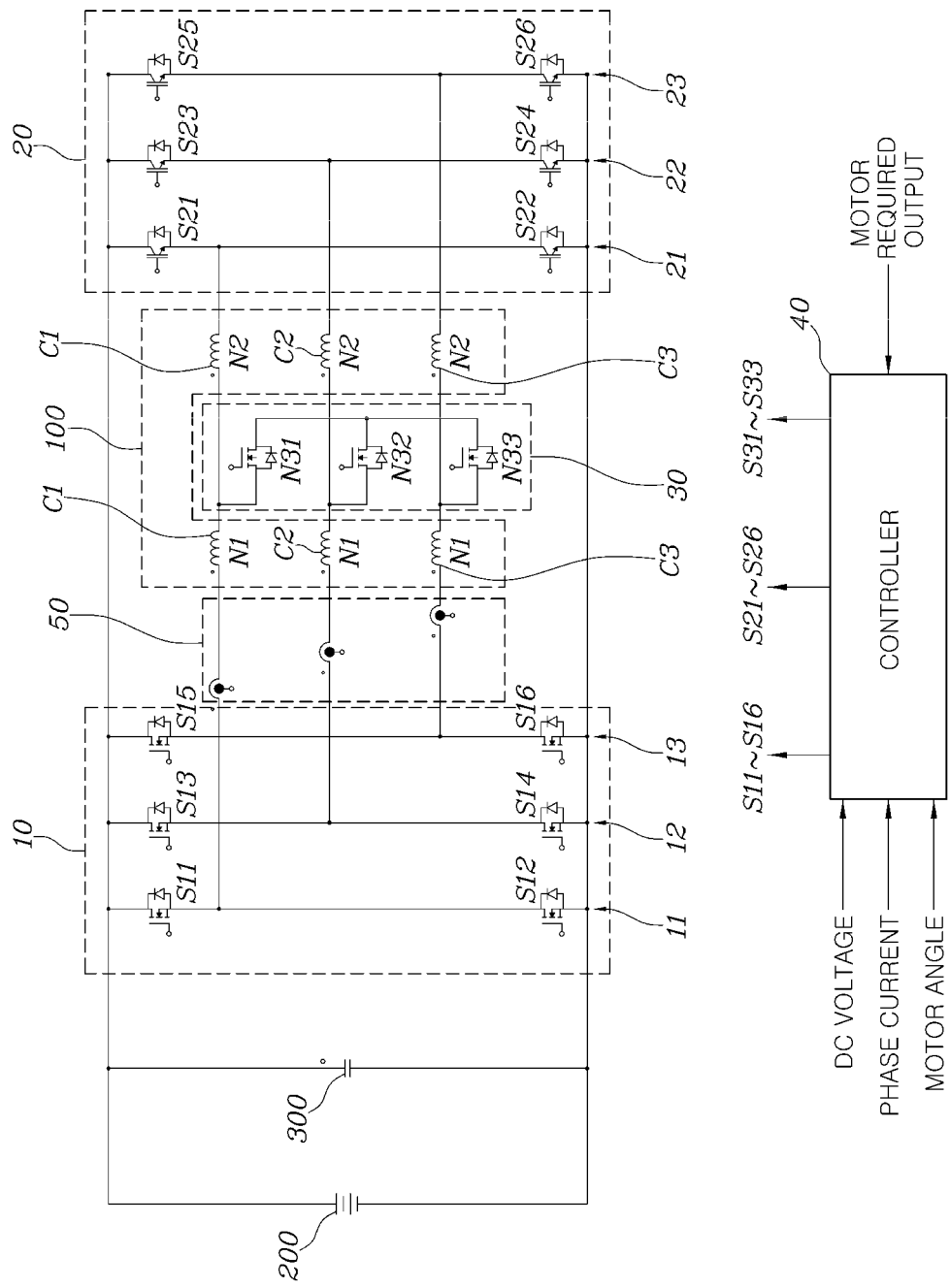
FIG. 1 is a circuit diagram illustrating a motor driving device according to an embodiment of the present disclosure.

FIG. 1 is a circuit diagram illustrating a motor driving device according to an embodiment of the present disclosure.

Referring to FIG. 1, a motor driving device according to an embodiment of the present disclosure is a motor driving device that supplies driving power to a motor 100 having a plurality of windings C1 to C3 corresponding to a plurality of phases, and may be configured to include a first inverter 10 that includes a plurality of first switching elements S11 to S16 and is connected to first stages of the windings of the motor 100, a second inverter 20 that includes a plurality of second switching elements S21 to S26 and is connected to second stages of the windings of the motor 100, third switching elements N31S31 to N33S33 that selectively interconnect/disconnect points that divide the number of turns of the windings of the motor 100 by a preset ratio of N1:N2, and a controller 40 that controls ON/OFF states of the first switching elements S11 to S16, the second switching elements S21 to S26, and the third switching elements N31S31 to N33S33 on the basis of a required output of the motor 100.

The first inverter 10 and the second inverter 20 may convert direct current (DC) power stored in a battery 200 into three-phase alternating current (AC) power and provide the three-phase AC power to the motor 100, or convert regenerative braking energy generated due to occurrence of regenerative braking torque of the motor 100 during regenerative braking into a direct current and provide the direct current to the battery 200. The conversion between the DC power and the AC power may be performed by pulse width modulation control of the plurality of first switching elements S11 to S16 and the plurality of second switching elements S21 to S26 that are provided to the first inverter 10 and the second inverter 20, respectively.

The first inverter 10 may include a plurality of legs 11 to 13 to which a DC voltage formed at a DC link capacitor 300 connected between opposite ends of the battery 200 is applied. The legs 11 to 13 may correspond to the plurality of phases of the motor 100 to obtain electrical connection. In particular, a first leg 11 may include two switching elements S11 and S12 connected in series between opposite ends of the DC link capacitor 300, and a connected node between the two switching elements S11 and S12 may be connected to one end of the winding C1 for one phase in the motor 100 such that AC power corresponding to one of the plurality of phases is input/output. Likewise, a second leg 12 may include two switching elements S13 and S14 connected in series between the opposite ends of the DC link capacitor 300, and a connected node between the two switching elements S13 and S14 may be connected to one end of the winding C2 for one phase in the motor 100 such that AC power corresponding to one of the plurality of phases is input/output. In addition, a third leg 13 may include two switching elements S15 and S16 connected in series between the opposite ends of the DC link capacitor 300, and a connected node between the two switching elements S15 and S16 may be connected to one end of the winding C3 for one phase in the motor 100 such that AC power corresponding to one of the plurality of phases is input/output.

The second inverter 20 may also have a configuration similar to that of the first inverter 10. The second inverter 20 may include a plurality of legs 21 to 23 to which the DC voltage formed at the DC link capacitor 300 connected between the opposite ends of the battery 200 is applied. The legs 21 to 23 may correspond to the plurality of phases of the motor 100 to obtain electrical connection. In particular, a first leg 21 may include two switching elements S21 and S22 connected in series between the opposite ends of the DC link capacitor 300, and a connected node between the two switching elements S21 and S22 may be connected to the second end of the winding C1 for one phase in the motor 100 such that AC power corresponding to one of the plurality of phases is input/output. Likewise, a second leg 22 may include two switching elements S23 and S24 connected in series between the opposite ends of the DC link capacitor 300, and a connected node between the two switching elements S23 and S24 may be connected to the second end of the winding C2 for one phase in the motor 100 such that AC power corresponding to one of the plurality of phases is input/output. In addition, a third leg 23 may include two switching elements S25 and S26 connected in series between the opposite ends of the DC link capacitor 300, and a connected node between the two switching elements S25 and S26 may be connected to the second end of the winding C3 for one phase in the motor 100 such that AC power corresponding to one of the plurality of phases is input/output.

The first inverter 10 is connected to first ends of the windings C1 to C3 of the motor 100, and the second inverter 20 is connected to second ends of the windings C1 to C3 of the motor 100. That is, open end winding type electrical connection may be formed in which the opposite ends of the windings C1 to C3 of the motor 100 are respectively connected to the first inverter 10 and the second inverter 20.

In the embodiment of the present disclosure, the third switching element 30 is configured to selectively interconnect/disconnect points that divide the number of turns of the plurality of windings C1 to C3 included in the motor 100 by a preset ratio of N1:N2. For example, the third switching element 30 may be made up of a total of three switching elements S31 to S33. First ends of the switching elements S31 to S33 may be connected to a point at which the number of turns of the plurality of windings C1 to C3 is divided by a preset ratio of N1:N2, and the second ends of the switching elements S31 to S33 may be interconnected (here, N1 and N2 are the real number of turns).

In this connection structure, in the case where the third switching element 30 is turned off, the motor 100 may be operated with the windings having the number of turns of N1+N2. In the case where the third switching element 30 is turned on, the windings C1 to C3 of the motor 100 form a Y-connection at a position at which the third switching element 30 is connected. For example, in the case where the third switching element 30 is turned on, all the plurality of switching elements S21 to S26 inside the second inverter 20 are turned off and are not operated, and the first inverter 10 is operated to drive the motor 100, so that the motor 100 may be driven as a motor having the number of turns of N1.

As the third switching elements S31 to S33, various switching devices known in the art such as a metal oxide semiconductor field effect transistor (MOSFET), an insulated gate bipolar transistor (IGBT), a thyristor, and a relay may be employed.

The controller 40 is an element that basically has pulse width modulation control over the switching elements S11 to S16 and S21 to S26 included in the first inverter 10 and the second inverter 20 such that the motor 100 can be driven on the basis of the required output of the motor 100. Especially, in various embodiments of the present disclosure, the controller 40 may determine an inverter used to drive the motor on the basis of the required output of the motor 100, thus determine an ON/OFF state of the third switching element 30, and have pulse width modulation control over the switching elements of the inverter determined to drive the motor.

In particular, if the required output of the motor 100 is smaller than a preset reference value, the controller 40 can have pulse width modulation control over the switching elements S11 to S16 of the first inverter 10 without operating the second inverter 20 and drive the motor 100 (for convenience of description, referred to as "first driving mode"). In this case, the controller 40 may control the third switching elements S31 to S33 to be in an ON state. Accordingly, the windings C1 to C3 of the motor 100 form a Y-connection for which the points at which the number of turns from first ends thereof connected to the first inverter 20 is N1 are mutually interconnected, and thus the motor 100 is operated as a motor whose windings have the number of turns of N1.

In this way, in the first driving mode, the third switching element 30 is turned on by operating the first inverter 10, and thereby control of driving the motor 100 whose windings have the number of turns of N1 and are Y-connected can be performed. Driving the motor in the first driving mode can be accomplished in such a way that a DC voltage of the first inverter 10, a phase current detected and provided to the motor 100 by a current sensor 50, and a motor angle detected by a motor rotor sensor (not illustrated) installed on the motor 100 are input into the controller 40, and then the controller 40 has pulse width modulation control over the first switching elements S11 to S16 of the first inverter 10. Since various techniques for having pulse width modulation control over one inverter and driving the motor 100 are already well-known in the art, a more detailed description of a technique for the pulse width modulation control of the inverter performed in the first driving mode will be omitted.

If the required output of the motor 100 is greater than a preset reference value, the controller 40 can operate both the first inverter 10 and the second inverter 20 to drive the motor 100 (for convenience of description, referred to as "second driving mode"). In this case, the controller 40 may control the third switching elements S31 to S33 to be in an OFF state. Accordingly, the windings C1 to C3 of the motor 100 have the number of turns of N1+N2, first ends thereof are connected to the first inverter 10, and the second ends thereof are connected to the second inverter 20. That is, the motor 100 in the second driving mode becomes an open end winding motor in which opposite ends of the windings C1 to C3 are in an open state, and may be driven by having pulse width modulation control over the two inverters 10 and 20 connected to the opposite ends of the windings C1 to C3.

Driving the motor in the second driving mode can be accomplished in such a way that a DC voltage of the first inverter 10, a DC voltage of the second inverter 20, a phase current detected and provided to the motor 100 by the current sensor 50, and a motor angle detected by the motor rotor sensor (not illustrated) installed on the motor 100 are input into the controller 40, and then the controller 40 has pulse width modulation control over the first switching elements S11 to S16 of the first inverter 10 and the second switching elements S21 to S26 of the second inverter 20. Since various techniques for having pulse width modulation control over two inverters connected to the opposite ends of the windings of the open end winding motor and driving the motor are already well-known in the art, a more detailed description of a technique for the pulse width modulation control of the inverters performed in the second driving mode will be omitted.

Figure 2:
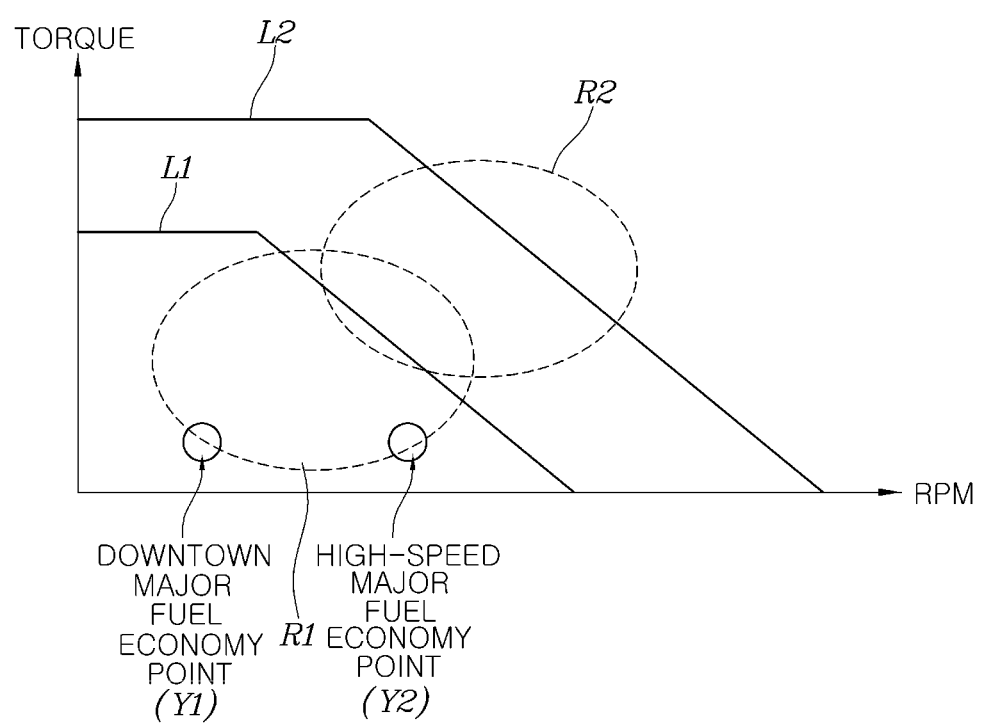
FIG. 2 is a graph illustrating a motor rotational speed (RPM)-motor torque curve and a high-efficiency region related to each motor driving mode of the motor driving device according to the embodiment of the present disclosure.

FIG. 2 is a graph illustrating a motor rotational speed (RPM)-motor torque curve and a high-efficiency region related to each motor driving mode of the motor driving device according to the embodiment of the present disclosure.

As described above, the motor driving device according to the embodiment of the present disclosure drives the Y-connected motor having the number of turns of N1 in the first driving mode by controlling the first inverter 10, and drives the open end winding motor having the number of turns of N1+N2 in the second driving mode by controlling the first inverter 10 and the second inverter 20.

As illustrated in FIG. 2, in the case where the motor 100 is applied to the driving of a vehicle, a major drive point of the vehicle is classified into a drive point Y1 during city driving (e.g., stop and go conditions) and a drive point Y2 during highway driving, and the drive points Y1 and Y2 are preferably included in a high-efficiency region of a motor-inverter system.

In the embodiment of the present disclosure, in the case where the motor 100 is applied to a vehicle, the number of turns of N1 is preferably determined such that the high-efficiency region of the motor-inverter system includes the major drive points Y1 and Y2 in the first driving mode. Since efficiency of the motor-inverter system is determined by a voltage utilization factor of the inverter, the number of turns of N1 of the windings C1 to C3 of the motor 100 in the first driving mode is preferably determined such that a region R1 where the voltage utilization factor of the inverter is more than or equal to a preset reference value by which the voltage utilization factor is excellent can be determined to be included in the major drive points Y1 and Y2 of the vehicle.

The second driving mode is a mode for driving the open end winding motor. It is known that, in comparison with the case where a motor for Y-connected windings having the same number of turns is simply driven by one inverter, output of the inverter can be set to be high by about $\sqrt{3}$ times in an open end winding driving type. That is, in the case where the open end winding driving type that is for the second driving mode is applied, the number of turns of the motor can be increased by $\sqrt{3}$ times, and thus current output for the motor producing the same output can be reduced by $\sqrt{3}$ times.

In this way, in the case where the open end winding driving type is applied, a current of the inverter can be reduced to increase efficiency compared to the driving mode of the Y-connected motor in order to produce the same output, and material costs can be reduced due to a reduction in amount of use of power semiconductors applied as switching elements.

As illustrated in FIG. 2, in the case where the second driving mode is applied, a region R2 that is more than or equal to a preset reference value by which, as the output of the motor increases, a voltage utilization factor of the motor-inverter system can be determined to be excellent hardly includes the major drive points Y1 and Y2. Therefore, as described above, it is preferred that the motor 100 is preferably operated to relatively reduce an output current of the inverter and reduce the amount of use of the power semiconductors by driving the motor 100 to improve efficiency in the first driving mode in a low torque region within which the major drive points Y1 and Y2 fall and by driving the motor 100 in the second driving mode in a region in which high output is required.

In addition, to further improve efficiency of the first driving mode operated in the low torque region within which the major drive points Y1 and Y2 fall, MOSFETs formed of SiC that is a material having a relatively small switching loss are more preferably employed as the switching elements S11 to S16 applied to the first inverter 10. In contrast, IGBTs formed of Si that is an inexpensive material are preferably employed as the switching elements S21 to S26 applied to the second inverter 20 operated in a high output region.

As described above, the motor driving device according to various embodiments of the present disclosure can determine whether to divide a turn ratio of the windings of the motor on the basis of the required output of the motor, divide the number of turns of the windings in a low output region such that the major drive points of the vehicle are included in a high efficiency region of the motor-inverter system in order to improve efficiency of the motor-inverter system, and realize high torque with a low current using the whole number of turns of the windings in a high output region.

Accordingly, the motor driving device according to various embodiments of the present disclosure can improve efficiency in an entire torque region to contribute to improving fuel economy of the vehicle, compared to the case where the conventional Y-connected motor is driven by one inverter.

Meanwhile, in the second driving mode, or a mode in which the open end winding motor is driven by opening all the third switching elements to simultaneously operate the first inverter 10 and the second inverter 20, the second switching elements S21 to S26 included in the second inverter 20 can be formed of, for instance, Si having a great switching loss, and thus entire motor driving efficiency is reduced. In the second driving mode, sizes of the second switching elements S21 to S26 should be increased to be driven with the same currents as the first switching elements S11 to S16 of the first inverter 10 which are formed of SiC, and thus an increase in material costs may be caused.

Therefore, a control technique capable of reducing a switching loss caused by the second switching elements S21 to S26 to increase efficiency and implementing the second driving mode without increasing the sizes of the second switching elements S21 to S26 is required.

Hereinafter, the mode in which the motor 100 is driven as the open end winding motor by opening all the third switching elements N31 to N33 to simultaneously operate the first inverter 10 and the second inverter 20 will be described in greater detail.

Figure 3:
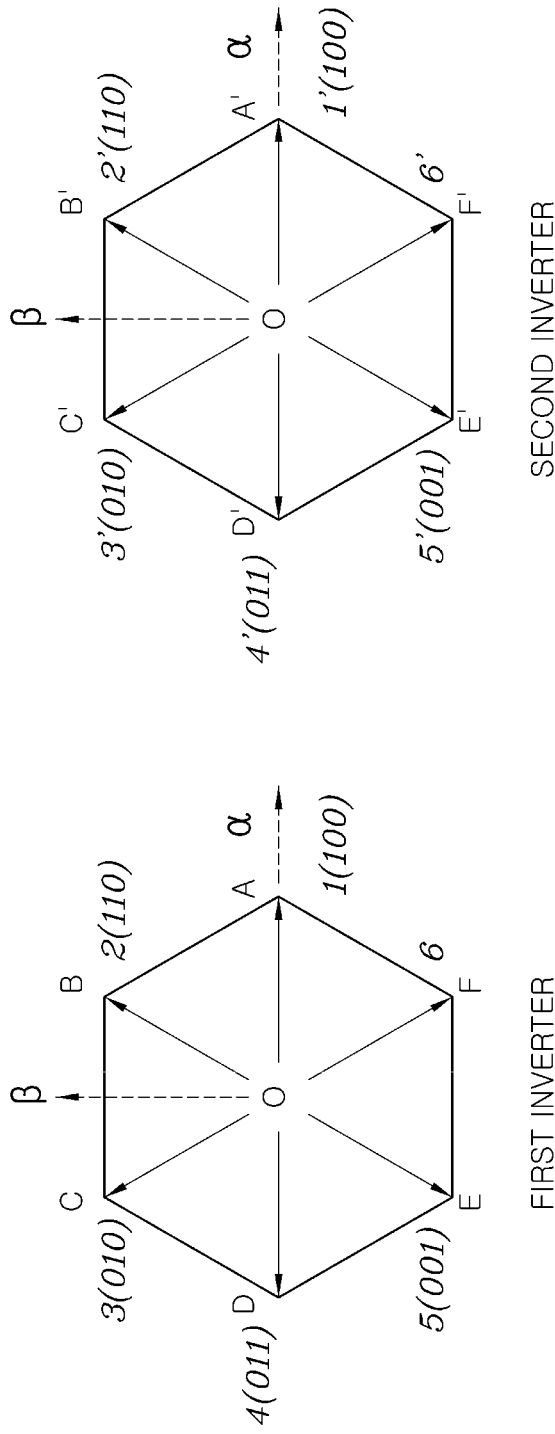
FIG. 3 is a diagram illustrating voltage vectors composed by two inverters applied to an open end winding motor.
Figure 4:
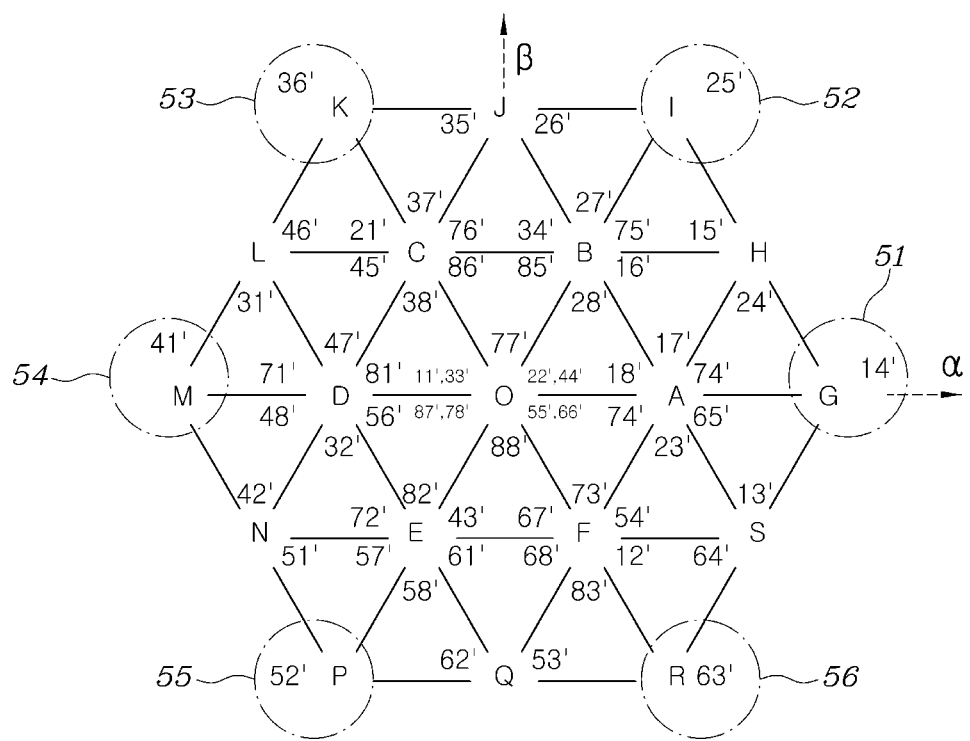
FIG. 4 is a diagram illustrating voltage vectors composed by two inverters when an open end winding type motor is driven.

FIG. 3 is a diagram illustrating voltage vectors composed by two inverters applied to an open end winding motor, and FIG. 4 is a diagram illustrating voltage vectors composed by two inverters when an open end winding type motor is driven.

In the circuit structure illustrated in FIG. 1, the first inverter 10 and the second inverter 20 may include the plurality of pairs of switching elements S11 and S12, S13 and S14, S15 and S16, and S21 and S22, S23 and S24, and S25 and S26 of the legs corresponding to the phases of the motor, and the switching elements of each leg may be operated complementarily to each other.

In the vector diagram illustrated in FIG. 3, the vertices and origin of a hexagon represent voltage vectors according to states of the switching elements of each inverter. For example, a point indicated by an index A represents a (100) voltage vector of the first inverter 10. Here, the (100) voltage vector means that the upper switching elements S11 of the switching elements S11 and S12 included in the leg corresponding to a phase A of the first inverter is in an ON state and the upper switching elements S13 and S15 of the switching elements included in the legs corresponding to the other phases are in an OFF state.

Further, the center of the hexagon corresponds to a (000) or (111) voltage vector, which means that all the upper switching elements of the legs of the inverter are in an ON or OFF state.

As illustrated in FIG. 3, the voltage vectors that can be composed by each inverter may be a total of eight voltage vectors by composition of the ON and OFF states of the six switching elements.

If the motor 100 is driven in an open end winding type after the third switching element 30 is turned off, the motor 100 has a structure in which the legs of the first inverter 10 and the second inverter 20 are connected to the opposites ends of the windings corresponding to the phases of the motor 100, and thus a phase voltage of each phase applied to the motor is applied by a difference between the phase voltage of the first inverter and the phase voltage of the second inverter. Further, because the first inverter 10 and the second inverter 20 are independently controlled, the voltage vectors that are actually applied to the motor may form a total of 64 voltage vectors as illustrated in FIG. 4 by a combination of eight voltage vectors that can be composed by the first inverter 10 and eight voltage vectors that can be composed by the second inverter 20.

Meanwhile, a common mode voltage in each of the inverters 10 and 20 may be defined as a value obtained by dividing the sum of the phase voltages of the phases by 3, and a voltage vector in which a difference between the common mode voltages of the two inverters is not zero when the open end winding type motor is driven is not preferably used when the motor is driven. This is because a flow of current generated by the difference between the common mode voltages of the two inverters 10 and 20 gives rise to a loss of power in the motor.

Voltage vectors indicated by reference symbols "51" to "56" in FIG. 4 are voltage vectors in which the difference between the common mode voltages of the two inverters is not zero.

For example, since an OS vector (a 13' vector) in FIG. 4 has a switching state of the first inverter which is (100) and a switching state of the second inverter which is (010), the common mode voltage of the first inverter may be calculated like "{(Vdc/2)+0+0}/3=Vdc/6", and the common mode voltage of the second inverter may be calculated like "{0+(Vdc/2)+0}/3=Vdc/6". Therefore, the difference between the two common mode voltages becomes zero.

In contrast, since an OG vector (a 14' vector) in FIG. 4 has a switching state of the first inverter which is (100) and a switching state of the second inverter which is (011), the common mode voltage of first inverter may be calculated like "{(Vdc/2)+0+0}/3=Vdc/6", and the common mode voltage of second inverter may be calculated like "{0+(Vdc/2)+(Vdc/2)}/3=Vdc/3". Therefore, the difference between the two common mode voltages becomes "−Vdc/6".

Here, Vdc may be a DC input voltage of the inverter, or a voltage of the battery 200.

If the difference between the two common mode voltages of the two inverters is calculated in the way given by way of example above, it can be found that the voltage vectors indicated by reference symbols "51" and "56" in FIG. 4 are the voltage vectors in which the difference between the common mode voltages of the two inverters is not zero.

Figure 5:
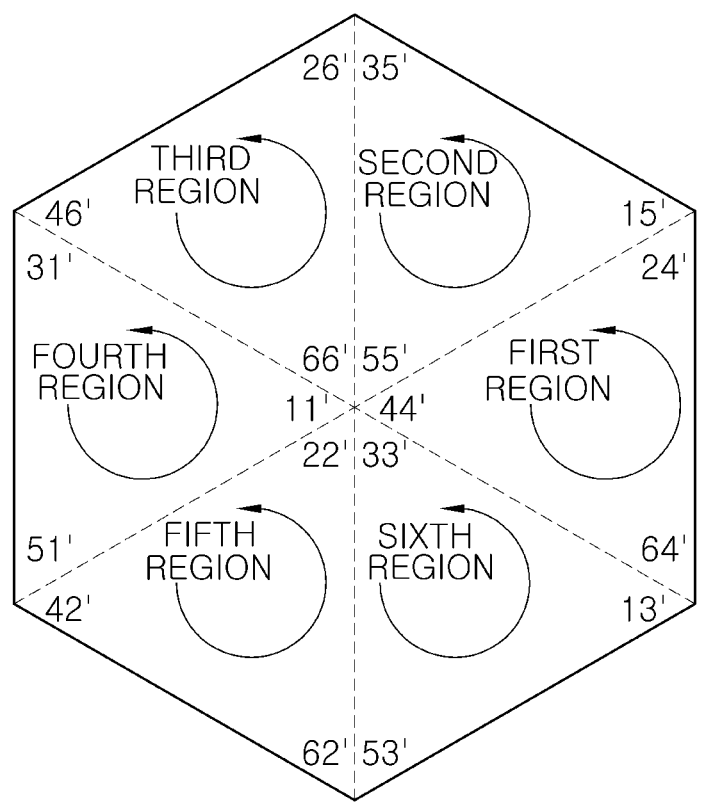
FIG. 5 is a vector diagram excluding voltage vectors generating a difference between two common mode voltages of two inverters from the vector diagram illustrated in FIG. 4.

FIG. 5 is a vector diagram excluding voltage vectors generating the difference between two common mode voltages of two inverters from the vector diagram illustrated in FIG. 4.

As illustrated in FIG. 5, if usable composite voltage vectors excluding the voltage vectors generating the difference between the two common mode voltages of the two inverters are interconnected, they are represented by a hexagon. Six regions divided by diagonals of the hexagon may control switching states of the second inverter in the same way.

For example, a first region of FIG. 5 has a configuration in which a switching state of the second inverter can be implemented by 4' or (011), and a second region has a configuration in which a switching state of the second inverter can be implemented by 5' or (001). Further, a third region has a configuration in which a switching state of the second inverter can be implemented by 6' or (101), and a fourth region has a configuration in which a switching state of the second inverter can be implemented by 1' or (100). In addition, a fifth region has a configuration in which a switching state of the second inverter can be implemented by 2' or (110), and a sixth region has a configuration in which a switching state of the second inverter can be implemented by 3' or (010). Each of the first to sixth regions is a region corresponding to an electrical angle of 60°, and all the first to sixth regions may correspond to an electrical angle of 360°.

In view of this point, the embodiment of the present disclosure is configured such that, to minimize the switching loss of the second inverter 20 using the switching elements formed of Si having a great switching loss, the switching elements of the second inverter according to each region are controlled to continuously maintain the switching state corresponding to the relevant region, and is configured to switch the switching elements of the first inverter 10 to compose desired voltage vectors. As a result, the embodiment of the present disclosure curbs the switching of the switching elements having a great switching loss to the utmost to minimize the switching loss, and thereby can improve the efficiency of the system.

Figure 6:
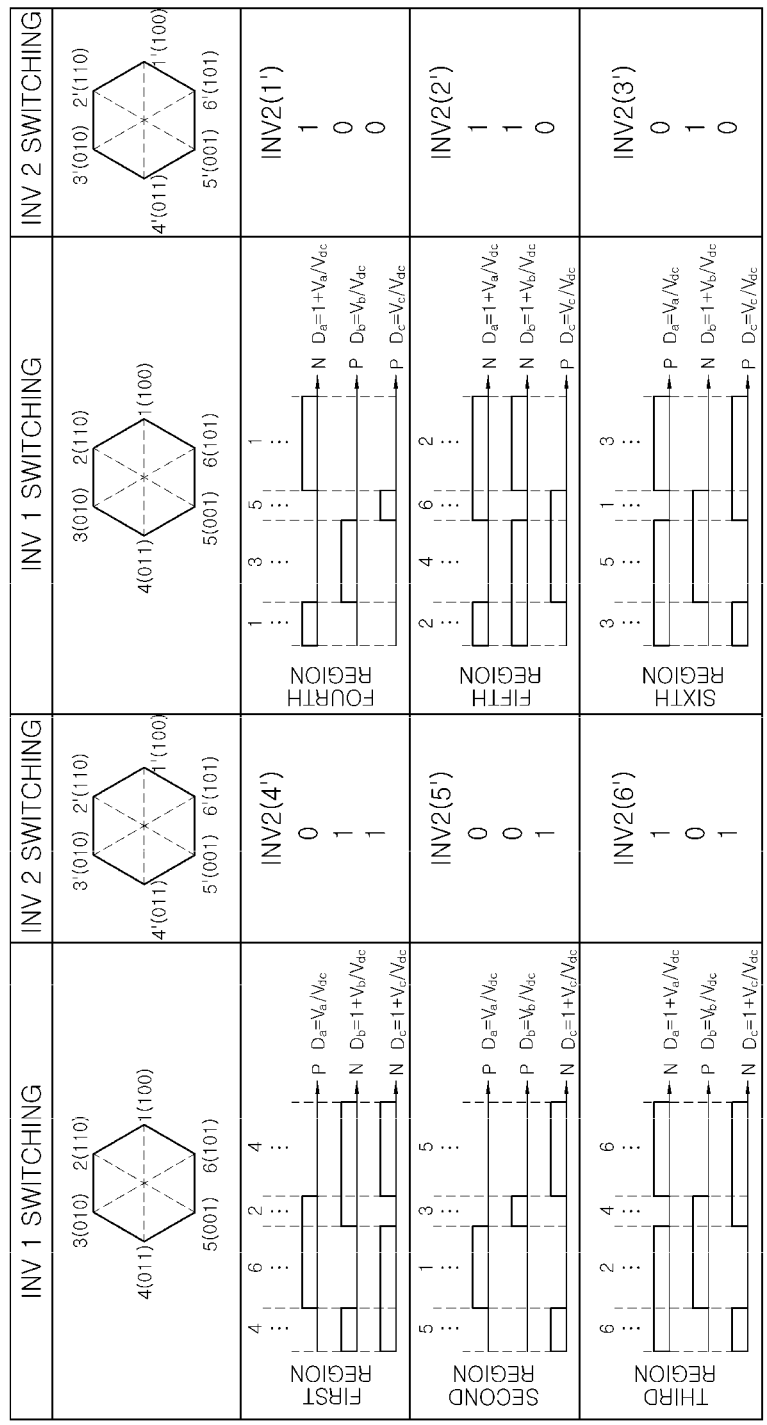
FIG. 6 is a diagram illustrating switching examples of region-specific first and second inverters illustrated in FIG. 5.

FIG. 6 is a diagram illustrating switching examples of the region-specific first and second inverters illustrated in FIG. 5.

Referring to FIG. 6, in the case where the voltage vector is intended to be composed in the first region of FIG. 5 during space vector pulse width modulation for driving the motor 100, the switching elements in the second inverter INV2 are switched to maintain a (011) state that is a switching state corresponding to 4', and the switching elements in the first inverter INV1 are switched to output switching states corresponding to 2, 4, and 6, and thereby a desired voltage vector may be composed. A switching duty of each phase in the first inverter may be properly adjusted according to a position of the voltage vector to be composed.

Further, in the case where the voltage vector is intended to be composed in the second region of FIG. 5 during the space vector pulse width modulation for driving the motor 100, the switching elements in the second inverter INV2 are switched to maintain a (001) state that is a switching state corresponding to 5', and the switching elements in the first inverter INV1 are switched to output switching states corresponding to 1, 3, and 5. Thereby, a desired voltage vector may be composed.

In addition, in the case where the voltage vector is intended to be composed in the third region of FIG. 5 during the space vector pulse width modulation for driving the motor 100, the switching elements in the second inverter INV2 are switched to maintain a (101) state that is a switching state corresponding to 6', and the switching elements in the first inverter INV1 are switched to output switching states corresponding to 2, 4, and 6. Thereby, a desired voltage vector may be composed.

In the case where the voltage vector is intended to be composed in the fourth region of FIG. 5 during the space vector pulse width modulation for driving the motor 100, the switching elements in the second inverter INV2 are switched to maintain a (100) state that is a switching state corresponding to 1', and the switching elements in the first inverter INV1 are switched to output switching states corresponding to 1, 3, and 5. Thereby, a desired voltage vector may be composed.

In the case where the voltage vector is intended to be composed in the fifth region of FIG. 5 during the space vector pulse width modulation for driving the motor 100, the switching elements in the second inverter INV2 are switched to maintain a (101) state that is a switching state corresponding to 2', and the switching elements in the first inverter INV1 are switched to output switching states corresponding to 2, 4, and 6. Thereby, a desired voltage vector may be composed.

In the case where the voltage vector is intended to be composed in the sixth region of FIG. 5 during the space vector pulse width modulation for driving the motor 100, the switching elements in the second inverter INV2 are switched to maintain a (101) state that is a switching state corresponding to 3', and the switching elements in the first inverter INV1 are switched to output switching states corresponding to 1, 3, and 5. Thereby, a desired voltage vector may be composed.

Figure 7:
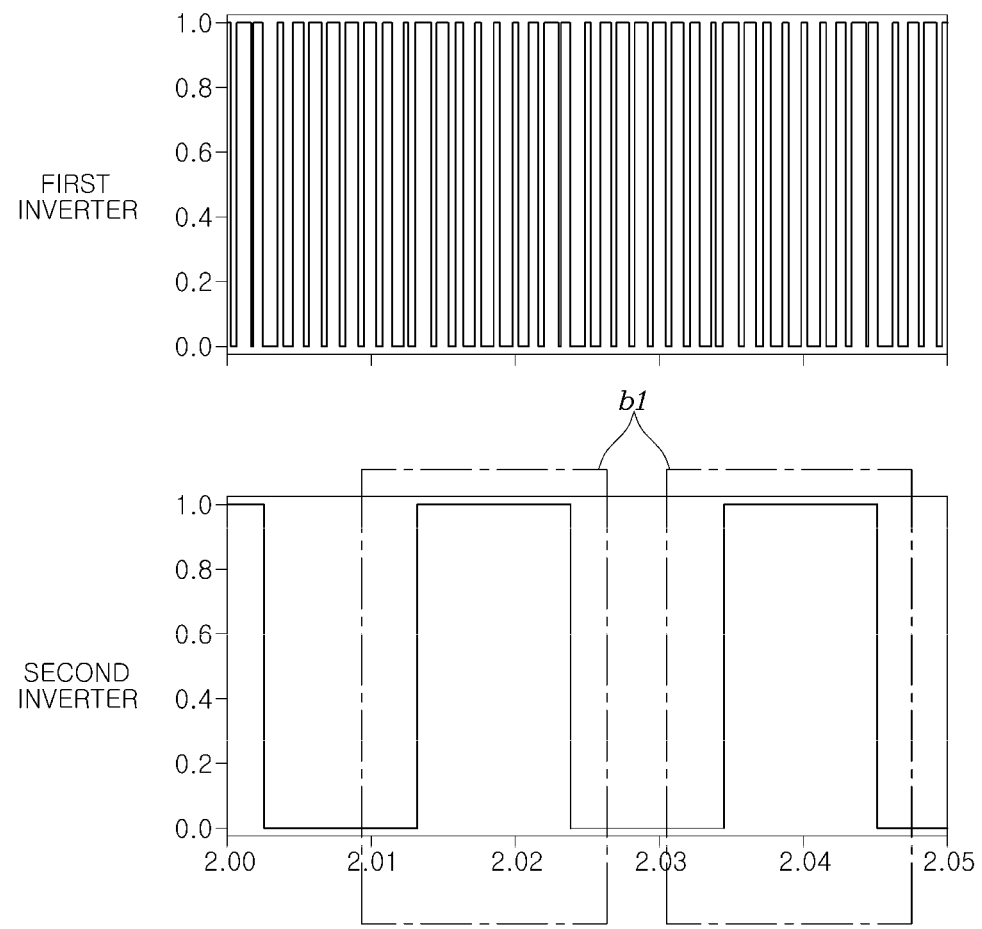
FIG. 7 is a diagram illustrating switching states of switching elements in a first inverter and switching states of the switching elements in a second inverter according to the embodiment of the present disclosure.
Figure 8:
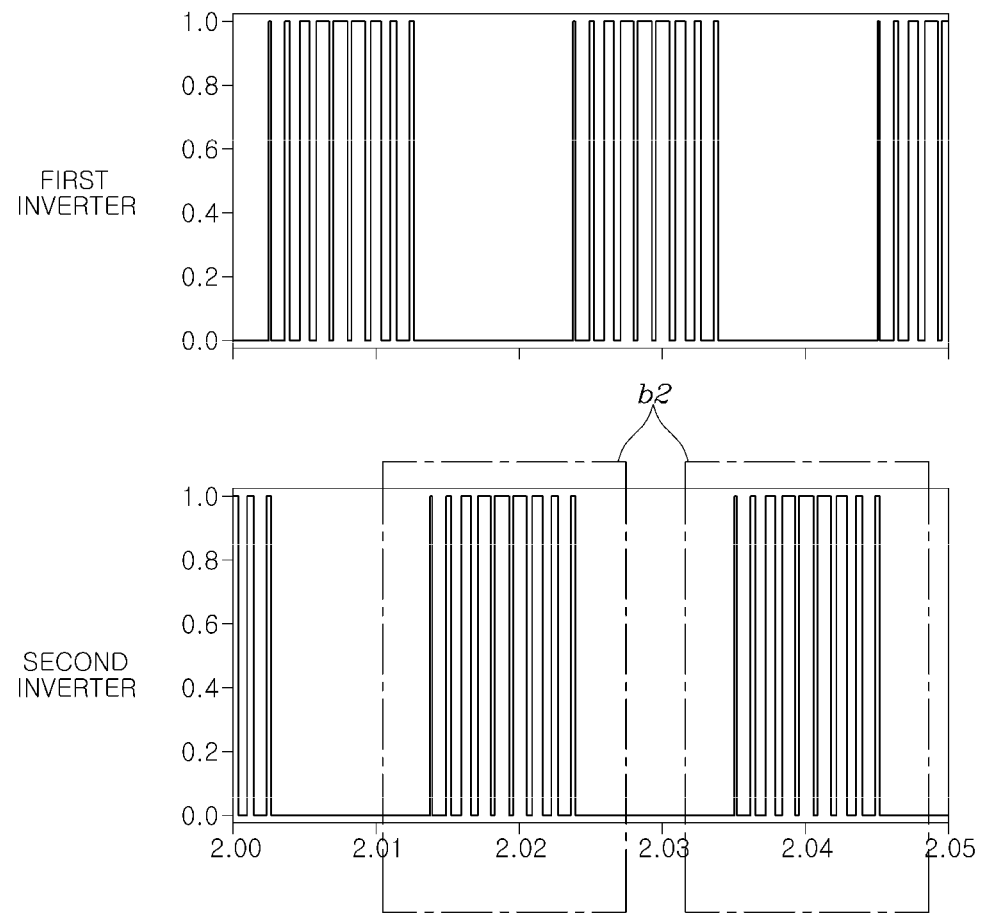
FIG. 8 is a diagram illustrating switching states of switching elements in a first inverter and switching states of the switching elements in a second inverter when a conventional open end winding type motor is driven.

FIG. 7 is a diagram illustrating switching states of switching elements in a first inverter and switching states of switching elements in a second inverter according to the embodiment of the present disclosure. FIG. 8 is a diagram illustrating switching states of switching elements in a first inverter and switching states of switching elements in a second inverter when a conventional open end winding type motor is driven.

As illustrated in FIG. 7, it can be found that switching of the second inverter is remarkably reduced in the embodiment of the present disclosure. This can be more clearly found from the switching states when the conventional open end winding type motor of FIG. 8 is driven.

As illustrated in FIG. 8, when the conventional open end winding type motor is driven, the switching elements in the second inverter also have a high-speed switching region b2. In the case where the second inverter is implemented by switching elements having a great switching loss like the switching elements formed of Si, a switching loss caused by switching the second inverter is greatly increased, which may lead to reducing efficiency of the entire system.

In contrast, the embodiment of the present disclosure can improve efficiency of the entire system by minimizing the switching of the second inverter having the switching elements having a great switching loss as represented by "b1" that is a region corresponding to "b2" of FIG. 8 and driving the first inverter having the switching elements formed of, for instance, SiC having a relatively small switching loss.

Although specific embodiments of the present disclosure have been described and illustrated, it will be apparent to those skilled in the art that the present disclosure car be variously modified and changed within the scope of the claims.

What is claimed is:

1. A motor driving device that drives a motor having a plurality of windings corresponding to a plurality of phases, the motor driving device comprising:
   a first inverter configured to include a plurality of first switching elements and connected to first stages of the plurality of windings;
   a second inverter configured to include a plurality of second switching elements and connected to second stages of the plurality of windings; and
   a controller configured to fix switching states of the second switching elements which has larger switching loss than the first switching elements and switch the first switching elements to compose target voltage vectors when the motor is driven in an open end winding type by operating the first inverter and the second inverter in a space vector pulse width modulation mode.

2. The motor driving device of claim 1, wherein the controller composes the target voltage vectors excluding voltage vectors in which a difference between a common mode voltage of the first inverter and a common mode voltage of the second inverter is not zero among voltage vectors composed by the first inverter and the second inverter.

3. The motor driving device of claim 1, wherein the controller composes the target voltage vectors by fixing ON/OFF states of the second switching elements and switching the first switching elements according to each region of voltage vectors composed by the first inverter and the second inverter.

4. The motor driving device of claim 3, wherein the controller connects points at which switching states of the second inverter are the same in a vector diagram illustrating the voltage vectors composed by the first inverter and the second inverter, and previously sets the regions.

5. The motor driving device of claim 3, wherein the controller composes the target voltage vectors by fixing switching states of the second switching elements corresponding to a region within which the target voltage vectors fall and switching the first switching elements to repeat switching states of the first switching elements in a given pattern.

6. The motor driving device of claim 1, wherein the first switching elements are field effect transistors formed of SiC, and the second switching elements are insulated-gate bipolar transistors formed of Si.

7. A motor driving device that drives a motor having a plurality of windings corresponding to a plurality of phases, the motor driving device comprising:
a first inverter configured to include a plurality of first switching elements and connected to first stages of the plurality of windings;
a second inverter configured to include a plurality of second switching elements and connected to second stages of the plurality of windings;
a plurality of third switching elements, first ends of which are connected to points dividing the number of turns of the plurality of windings at a preset ratio and second ends of which are interconnected; and
a controller configured to turn off the third switching elements if a required output of the motor is more than or equal to a preset reference value, and operate the first inverter and the second inverter in a space vector pulse width modulation mode by fixing switching states of the second switching elements which has larger switching loss than the first switching elements and switching the first switching elements to compose target voltage vectors.

8. The motor driving device of claim 7, wherein the controller composes the target voltage vectors excluding voltage vectors in which a difference between a common mode voltage of the first inverter and a common mode voltage of the second inverter is not zero among voltage vectors composed by the first inverter and the second inverter.

9. The motor driving device of claim 7, wherein the controller composes the target voltage vectors by fixing ON/OFF states of the second switching elements and switching the first switching elements according to each region of voltage vectors composed by the first inverter and the second inverter.

10. The motor driving device of claim 9, wherein the controller connects points at which switching states of the second inverter are the same in a vector diagram illustrating the voltage vectors composed by the first inverter and the second inverter, and previously sets the regions.

11. The motor driving device of claim 9, wherein the controller composes the target voltage vectors by fixing switching states of the second switching elements corresponding to a region within which the target voltage vectors fall and switching the first switching elements to repeat switching states of the first switching elements in a given pattern.

12. The motor driving device of claim 7, wherein the first switching elements are field effect transistors formed of SiC, and the second switching elements are insulated-gate bipolar transistors formed of Si.

* * * * *